US012240259B2

(12) United States Patent
Ha et al.

(10) Patent No.: US 12,240,259 B2
(45) Date of Patent: Mar. 4, 2025

(54) SUBSTRATE PROCESSING DEVICE AND CONTROL METHOD FOR SUBSTRATE PROCESSING DEVICE

(71) Applicant: SEMES CO., LTD., Cheonan-si (KR)

(72) Inventors: Sang Min Ha, Hwaseong-si (KR); Hyeong Jun Cho, Seoul (KR); Jae Hong Kim, Asan-si (KR); Sang Hyun Son, Busan (KR); Young-Joo Seo, Gwangju-si (KR)

(73) Assignee: SEMES CO., LTD., Cheonan-si (KR)

( * ) Notice: Subject to any disclaimer, the term of this patent is extended or adjusted under 35 U.S.C. 154(b) by 114 days.

(21) Appl. No.: 18/147,910

(22) Filed: Dec. 29, 2022

(65) Prior Publication Data
US 2023/0211622 A1  Jul. 6, 2023

(30) Foreign Application Priority Data

Dec. 30, 2021 (KR) .................. 10-2021-0192303
Oct. 4, 2022 (KR) .................. 10-2022-0126630

(51) Int. Cl.
*B41M 5/00* (2006.01)
*B41J 2/01* (2006.01)
(Continued)

(52) U.S. Cl.
CPC .............. *B41M 5/0047* (2013.01); *B41J 2/01* (2013.01); *B41J 2/015* (2013.01); *B41J 2/2135* (2013.01);
(Continued)

(58) Field of Classification Search
CPC . B41M 5/0047; B41J 2/01; B41J 2/015; B41J 2/2135; B41J 19/145; B41J 19/207; B41J 29/393; B41J 3/407; C09D 11/30
See application file for complete search history.

(56) References Cited

U.S. PATENT DOCUMENTS

2008/0080013 A1* 4/2008 Akiyama ............... H04N 1/053
358/410
2013/0083108 A1* 4/2013 Sanada .................. B41J 19/205
347/10

FOREIGN PATENT DOCUMENTS

JP    2013139009 A  *  7/2013  ............... B05C 5/00
JP    5551669 B2      7/2014
(Continued)

OTHER PUBLICATIONS

Office Action issued Jun. 25, 2024 in Korean Application No. 10-2022-0126630.

*Primary Examiner* — Yaovi M Ameh (74) *Attorney, Agent, or Firm* — Harness, Dickey & Pierce, P.L.C.

(57) ABSTRACT

Disclosed is a substrate processing device which includes a substrate transfer part on which a transfer object is received and a jetting system part includes an ink jet body that jets and prints ink on the transfer object over an upper surface of the substrate transfer part, an ink module transfer part that transfers the ink jet body, an encoder disposed around the ink module transfer part to output a movement signal per unit movement distance of the ink module transfer part, an ink ejection controller that interworks with the ink jet body to control an ink jetting timing of the ink jet body, and a signal splitter that interworks with the encoder to count the movement signal, reset a width of the counted movement signal, and transmit the movement signal, the width of which is reset, to the ink ejection controller.

9 Claims, 4 Drawing Sheets

(51) Int. Cl.
    *B41J 2/015*     (2006.01)
    *B41J 2/21*     (2006.01)
    *B41J 19/14*     (2006.01)
    *B41J 19/20*     (2006.01)
    *B41J 29/393*     (2006.01)
    *C09D 11/30*     (2014.01)
    *B41J 3/407*     (2006.01)

(52) U.S. Cl.
    CPC ........... *B41J 19/145* (2013.01); *B41J 19/207* (2013.01); *B41J 29/393* (2013.01); *C09D 11/30* (2013.01); *B41J 3/407* (2013.01)

(56) References Cited

FOREIGN PATENT DOCUMENTS

| JP | 2016083604 A | * | 5/2016 | ............... B05C 5/00 |
| JP | 6286671 B2 | | 3/2018 | |

\* cited by examiner

SUBSTRATE PROCESSING DEVICE AND CONTROL METHOD FOR SUBSTRATE PROCESSING DEVICE

CROSS-REFERENCE TO RELATED APPLICATIONS

A claim for priority under 35 U.S.C. § 119 is made to Korean Patent Application No. 10-2021-0192303 filed on Dec. 30, 2021 and Korean Patent Application No. 10-2022-0126630 filed on Oct. 4, 2022, in the Korean Intellectual Property Office, the entire contents of each of which are hereby incorporated by reference.

BACKGROUND

Embodiments of the inventive concept described herein relate to a substrate processing device, and more particularly, relate to a substrate processing device for jetting and printing ink on a substrate and a control method for the substrate processing device.

There is a jetting system which jets chemical liquid ink, such as an alignment film, onto the glass among display manufacturing facilities.

Such a jetting system drives a nozzle of the head in a piezo scheme to jet ink onto a glass for display while moving an ink-jet head and an ejection module transfer device on a two-dimensional (2D) plane.

In this case, in general, when dividing the X-axis and the Y-axis on the 2D plane, the jetting system prints ink on the entire upper surface of a transfer object while repeating the process of applying ink while moving the ejection module transfer device disposed over the transfer object and coupled to an ink ejection module along the Y-axis, in the state where it transfers the transfer object on which ink will be applied at a certain distance along the X-axis on a lower transfer base, and moving the transfer object to be applied at a certain distance along the X-axis again after the application is completed and transferring the ejection module transfer device again along the Y-axis.

At this time, the jetting system receives pulse waves through an encoder to identify a time point when the ink is jetted. The encoder generates pulse waves per specific movement interval of the ejection module transfer device and inputs the pulse waves to an ink ejection controller. Receiving the pulse waves, the ink ejection controller identifies a location of the ejection module transfer device based on the number of the received pulse waves to eject ink.

Herein, when resolution is set to 100 nm and when the ejection module transfer device moves 100 nm, the encoder generates one pulse wave signal. At this time, the ink ejection controller identifies that the ejection module transfer device moves 100 nm and proceeds with various control driving such as PID control of the ejection module transfer device based on it. In this case, the ink ejection controller determines that the ejection module transfer device moves 100 nm for one pulse wave signal and jets ink when the corresponding point is a location onto which ink should be jetted.

In this case, the jetting system jets ink in the process where the ejection module transfer device continuously moves. At this time, when the resolution of the encoder is 100 nm and when the ejection module transfer device moves at intervals of 20 um, the jetting system counts about 200 pulse waves to know a jetting location.

Because a conventional jetting system had low printing resolution and had sufficient production time, in general, it used a method of applying ink by connecting a plurality of ink ejection controllers in a daisy chain method.

However, in recent years, efforts have been made to shorten the production time as much as possible. Accordingly, a signal delay problem has occurred due to a difference in cable length. To address it, the ink ejection controller solves the problem in a manner as to set an output timing of a signal splitter to have the same time delay even when the length of the cable is different.

However, as such, despite the settings for adjusting the time delay of the signal splitter or the like, as the resolution of printing should increase and the production time should be shortened, the ejection module transfer device should be moved at a higher speed than before.

Thus, the pulse wave generated per 100 nm by the encoder is very narrower in width than before. For example, because the width of the pulse wave of the encoder is formed as 100 ns when the ejection module transfer device moves 1 m/s, the width of the pulse wave is very narrower than before.

At this time, for the ink ejection controller to distinguish the pulse wave generated by the encoder from the instantaneously input noise, an expensive controller capable of processing signals at the high speed should be adopted.

However, as such, when the expensive ink ejection controller is adopted, because the cost compared to the effect increases dramatically, in reality, there is no choice but to find another method.

Thus, to solve the conventional problem caused by the narrowing of the width of the pulse wave generated by the encoder, it should be able to distinguish between the pulse wave the encoder and noise and the ink ejection controller should not recognize the pulse wave of the encoder as noise.

For example, assuming that the ejection module transfer device moves 1 m/s and the width of the pulse wave generated per 100 nm by the encoder is 100 ns, when strong noise having the width of 100 ns occurs around the cable and the signal processing stage, the ink ejection controller recognizes the strong noise having the width of 100 ns as a pulse wave of the encoder. Due to this, because the location recognized by the ink ejection controller is recognized by advancing one step, the ink ejection location is different from the planned location.

Furthermore, as the ejection module transfer device accelerates momentarily in the process of moving 1 m/s, the width of the pulse wave decreases to 100 ns or less. At this time, as the case where the ink ejection controller does not recognize the pulse wave of the encoder occurs, because the location actually recognized by the ink ejection controller is recognized by reversing one step, the ink ejection location is different from the planned location.

SUMMARY

Embodiments of the inventive concept provide a substrate processing device for distinguishing pulse waves of the encoder, which are input to an ink ejection controller, from noise, such that an expensive ink ejection controller is not used not to increase production costs, and such that an ink jet body moves at a higher speed than before to improve productivity, and a control method for the substrate processing device.

According to an embodiment, a substrate processing device may include a substrate transfer part on which a transfer object is received and a jetting system part including an ink jet body that jets and prints ink on the transfer object over an upper surface of the substrate transfer part, an ink module transfer part that transfers the ink jet body, an encoder disposed around the ink module transfer part to output a movement signal per unit movement distance of the ink module transfer part, an ink ejection controller that interworks with the ink jet body to control an ink jetting timing of the ink jet body and a signal splitter that interworks with the encoder to count the movement signal, reset a width of the counted movement signal, and transmit the movement signal, the width of which is reset, to the ink ejection controller.

According to an embodiment, the encoder may output the movement signal as pulse waves. The signal splitter may count widths of the pulse waves and may reset the counted widths to output an alternative pulse wave.

According to an embodiment, the signal splitter may count the pulse waves output from the encoder for each defined unit and may reset the widths of the counted pulse waves to output the alternative pulse wave.

According to an embodiment, the signal splitter may output an alternative pulse wave for precision movement in a non-defined unit deviating from the defined unit together with the alternative pulse wave.

According to an embodiment, the signal splitter may subtract or add a width corresponding to one or more pulse waves output from the encoder from or to the pulse waves output from the encoder when outputting the alternative pulse wave for precision movement.

According to an embodiment, a plurality of ink jet bodies and a plurality of ink ejection controllers may interwork with each other to jet the ink. The signal splitter may output the alternative pulse wave to each of the plurality of ink ejection controllers.

According to an embodiment, the signal splitter may generate the alternative pulse wave using a multiplier.

According to an embodiment, the ink module transfer part may include a module base on which the ink jet body is mounted, an actuator driving part that transfers the module base in one direction, and an ink module location controller that controls the actuator driving part to transfer the module base and control a location where the ink is jetted.

According to an embodiment, the ink module location controller may interwork with the encoder to obtain location information of the module base from the encoder.

According to an embodiment, the substrate transfer part may include a base controller that the transfers object depending on a predetermined work command.

According to an embodiment, a control method for a substrate processing device may include transferring, by an ink module transfer part included in the substrate processing device, an ink jet body disposed over a transfer object, outputting, by an encoder included in the substrate processing device, a movement signal per movement distance when the ink jet body moves, receiving, a signal splitter included in the substrate processing device, the movement signal, counting, by the signal splitter, the movement signal, resetting, by the signal splitter, a width of the counted movement signal, and outputting, by the signal splitter, the movement signal, the width of which is reset, outputting and distributing, by the signal splitter, the movement signal, the width of which is reset, to each ink ejection controller and identifying, by the ink ejection controller, a location of the ink jet body based on the movement signal, the width of which is reset, and adjusting and setting, by the ink ejection controller, location information of the ink jet body based on the movement signal, the width of which is reset, and transmitting, by the ink ejection controller, a jetting command such that the ink jet body jets ink when the adjusted location corresponds to an ink jetting location.

According to an embodiment, the encoder may output the movement signal as pulse waves. The signal splitter may count widths of the pulse waves and may reset the counted widths to output an alternative pulse wave.

According to an embodiment, the signal splitter may count the pulse waves output from the encoder for each defined unit and may reset the widths of the counted pulse waves to output the alternative pulse wave.

According to an embodiment, the signal splitter may output an alternative pulse wave for precision movement in a non-defined unit deviating from the defined unit together with the alternative pulse wave.

According to an embodiment, the signal splitter may subtract or add a width corresponding to one or more pulse waves output from the encoder from or to the pulse waves output from the encoder when outputting the alternative pulse wave for precision movement.

According to an embodiment, the signal splitter may generate the alternative pulse wave using a multiplier.

According to an embodiment, the ink module transfer part may include a module base on which the ink jet body is mounted, an actuator driving part that transfers the module base in one direction, and an ink module location controller that controls the actuator driving part to transfer the module base and control a location where the ink is jetted.

According to an embodiment, the ink module location controller may interwork with the encoder to obtain location information of the module base from the encoder.

According to an embodiment, the control method may further include transferring the transfer object received on a substrate transfer part depending on a predetermined command of a base controller to arrange the transfer object at a specific location under the ink jet body, before transferring the ink jet body.

According to an embodiment, a substrate processing device may include a substrate transfer part on which a transfer object is received and a jetting system part including an ink jet body that jets and prints ink on the transfer object over an upper surface of the substrate transfer part, an ink module transfer part that transfers the ink jet body, an encoder disposed around the ink module transfer part to output a movement signal per unit movement distance of the ink module transfer part, an ink ejection controller that interworks with the ink jet body to control an ink jetting timing of the ink jet body, and a signal splitter that interworks with the encoder to count the movement signal, reset a width of the counted movement signal, and transmit the movement signal, the width of which is reset, to the ink ejection controller. The encoder may output the movement signal as pulse waves. The signal splitter may count widths of the pulse waves and may reset the counted widths to output an alternative pulse wave. The signal splitter may count the pulse waves output from the encoder for each defined unit and may reset the widths of the counted pulse waves to output the alternative pulse wave. The signal splitter may output an alternative pulse wave for precision movement in a non-defined unit deviating from the defined unit together with the alternative pulse wave. The signal splitter may subtract or add a width corresponding to one or more pulse waves output from the encoder from or to the pulse waves output from the encoder when outputting the alternative pulse wave for precision movement. A plurality of ink jet bodies and a plurality of ink ejection controllers may interwork with each other to jet the ink. The signal splitter may output the alternative pulse wave to each of the plurality of ink ejection controllers. The signal splitter may generate the alternative pulse wave using a multiplier. The ink module transfer part may include a module base on which the ink jet body is mounted, an actuator driving part that transfers the module base in one direction and an ink module location controller that controls the actuator driving part to transfer the module base and controls a location where the ink is jetted. The ink module location controller may interwork with the encoder to obtain location information of the module base from the encoder.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, an embodiment for implementing the inventive concept will be described with reference to the accompanying drawings. In this case, when a certain part "includes" a certain component throughout the specification, it is considered to mean that it may further include other components, rather than controlling other components, unless otherwise stated. Furthermore, the term " . . . unit" used in the specification may refer to a unit of processing at least one function or operation when describing electronic hardware or electronic software, which is considered to mean one part, function, use, point, or driving element, when describing a mechanical device. Furthermore, hereinafter, the same configuration or a similar configuration will be described using the same reference number, and a duplicated description of the same component will be omitted.

Figure 1:
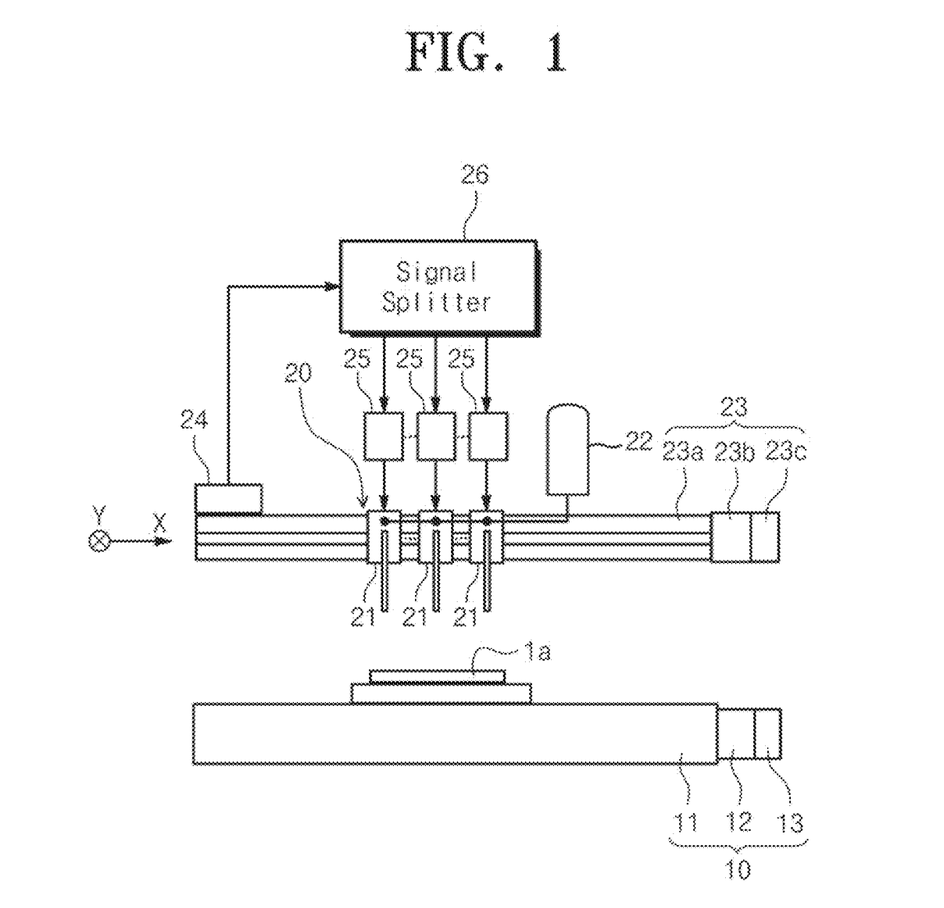
FIG. 1 is a drawing illustrating a configuration of a substrate processing device according to an embodiment of the inventive concept.
Figure 2:
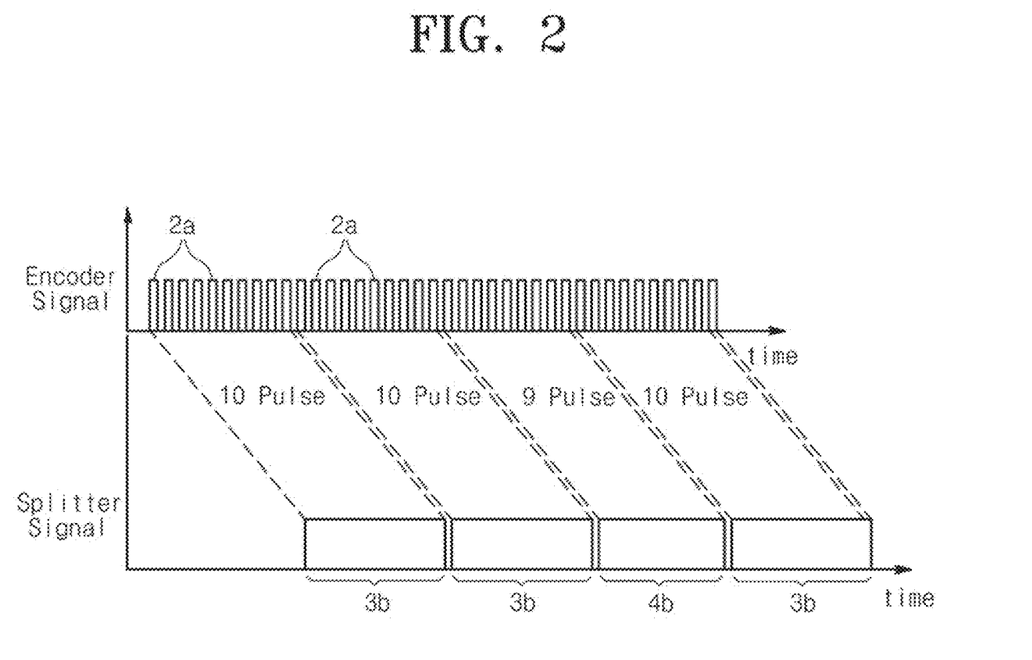
FIG. 2 is a graph for comparing a pulse wave output from an encoder shown in FIG. 1 with an alternative pulse wave output from a signal splitter shown in FIG. 1 in the same time zone.
Figure 3:
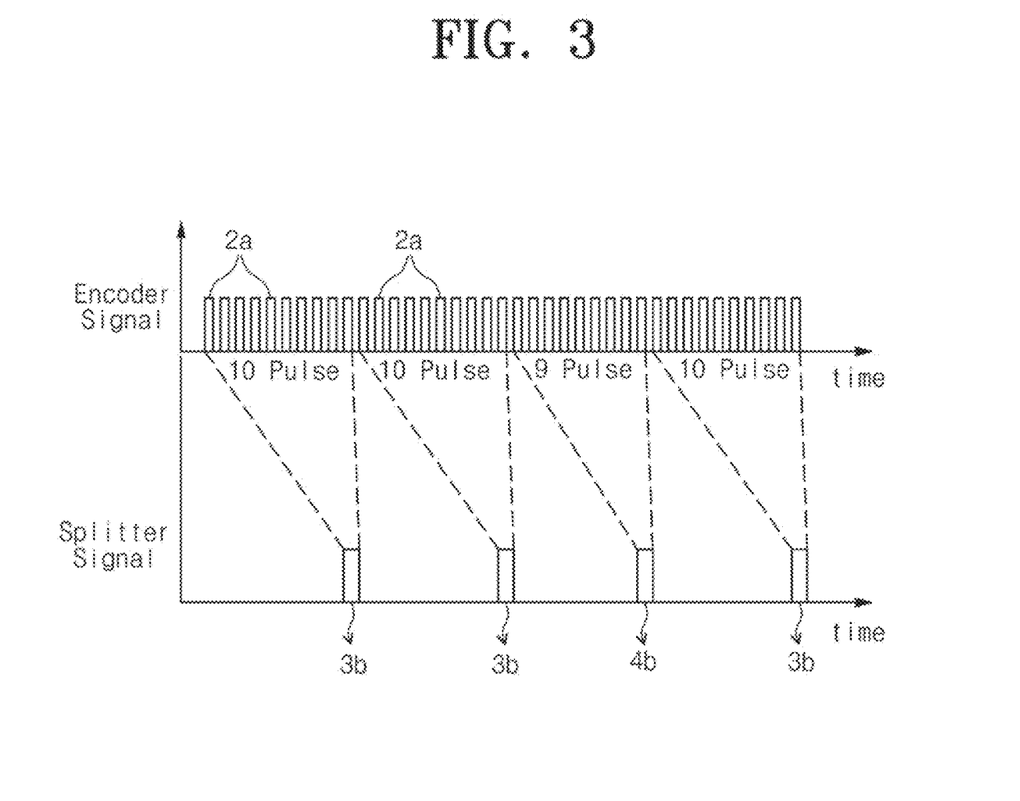
FIG. 3 is a graph in a state where an alternative pulse wave shown in FIG. 2 is transformed into another alternative pulse wave.

FIG. 1 is a drawing illustrating a configuration of a substrate processing device according to an embodiment of the inventive concept. FIG. 2 is a graph for comparing a pulse wave output from an encoder shown in FIG. 1 with an alternative pulse wave output from a signal splitter shown in FIG. 1 in the same time zone. FIG. 3 is a graph in a state where an alternative pulse wave shown in FIG. 2 is transformed into another alternative pulse wave.

As shown in FIG. 1, the substrate processing device according to an embodiment of the inventive concept may include a substrate transfer part 10 and a jetting system part 20.

The substrate transfer part 10 may include a transfer base 11 on which a transfer object 1a is received, a transfer actuator driving part 12 for transferring the transfer base 11 in one axis or more directions, and a base controller 13 for controlling the transfer actuator driving part 12. In this case, the transfer actuator driving part 12 may be composed of a transfer device such as a linear motor or a linear actuator. In the present embodiment, the substrate transfer part 10 is exemplified as a one-axis transfer device which transfers the transfer base 11 along one axis. Herein, the transfer object 1a transferred by the substrate transfer part 10 may be composed of a display substrate printed by ink and the display substrate may be transferred. However, the transfer object 1a transferred by the substrate transfer part 10 is not limited to the display substrate in the inventive concept. It is obvious that the transfer object 1a is able to be implemented by being various transformed into a printed circuit board and the like. Herein, the substrate transfer part 10 may be disposed to cross an ink module transfer part 23 to be described below. For example, when transferring the transfer object 1a along the Y-axis on the plane with respect to the X-axis and the Y-axis, the ink module transfer part 23 may move along the X-axis to move on the plane. Furthermore, the substrate transfer part 10 may interwork with an ink ejection controller 25 to transmit location information about the Y-axis of the transfer object 1a. In this case, the location information about the Y-axis may be transmitted from a device having an encoding function, which is installed in the substrate transfer part 10 to provide the location information of the Y-axis. Furthermore, the base controller 13 may interwork with the substrate transfer part 10 to transfer the transfer base 11 of the substrate transfer part 10 depending on a predetermine work command, thus transferring the transfer object 1a received on the transfer base 11. In this case, when the jetting system part 20 proceeds with an ink jetting command, the base controller 13 may stop transferring the transfer object 1a and may move a certain distance after printing proceeds on a partial area of the transfer object 1a to proceed with printing on a next area of the transfer object 1a.

The jetting system part 20 may include an ink jet body 21 for jetting ink, an ink supply part 22, the ink module transfer part 23, an encoder 24, the ink ejection controller 25, and a signal splitter 26.

The ink jet body 21 may be formed, including a piezo element (not shown) and a head part (not shown) equipped with the piezo element, through which ink passes. Such an ink jet body 21 may be connected with the ink supply part 22. When the ink supplied from the ink supply part 22 is introduced into a flow path inside the head part, the piezo element coupled to the head part may be driven to eject the ink inside the head part. However, the configuration of the ink jet body 21 is not limited to the scheme using the piezo element in the inventive concept. It is obvious that the configuration of the ink jet body 21 is implemented by being transformed in various forms such as a type for heating the heat part. In this case, the ink jet body 21 may be mounted on a module base 23a to jet the ink while varying in jetting location. Such an ink jet body 21 may be composed of a plurality of ink jet bodies 21 to be disposed in a state where the plurality of ink jet bodies 21 are spaced apart from each other. The plurality of ink jet bodies 21 may jet the ink on a printed surface of the transfer object 1a at the same time to reduce an ink application time.

The ink supply part 22 may interwork with the ink jet body 21 to pump and supply the ink to the ink jet body 21. In this case, the ink may be variously formed as display RGB light emitting layer ink, conductive ink for wiring on a substrate layer, ink for doping for doping of a semiconductor, ink for insulating for forming an insulating layer, and the like, depending on a process.

The ink module transfer part 23 may include the module base 23a on which the ink jet body 21 is mounted, an actuator driving part 23b for transferring the module base 23a in one direction, and an ink module location controller 23c for controlling the actuator driving part 23b to transfer the module base 23a and controlling a location where the ink is jetted. In this case, the actuator driving part 23b may be composed of a linear motor or a linear actuator, which interworks with the module base 23a to transfer the module base 23a in one axis or more directions. In the present embodiment, the ink module transfer part 23 is exemplified as a one-axis transfer device which transfers the module base 23a along one axis. Herein, the plurality of ink jet bodies 21 may be arranged spaced apart from each other on the ink module transfer part 23. Furthermore, the ink module location controller 23c may receive pulse waves 2a from the encoder 24 to obtain location information of the encoder 24 and may control the actuator driving part 23b based on the location information of the encoder 24 to control the location of the ink jet body 21.

The encoder 24 may be mounted around the ink module transfer part 23 to detect a straight movement distance of the ink jet body 21. In the present embodiment, the encoder 24 may output the pulse waves 2a, which is a signal for each movement distance, to the signal splitter 26 per unit movement distance of the ink module transfer part 23. For example, the encoder 24 may output one pulse wave 2a when the ink module transfer part 23 moves at intervals of 100 nm. At this time, a width of the pulse waves 2a output from the encoder 24 may correspond to 100 ns when a transfer speed of the ink module transfer part 23 is 1 m/s. In this case, the more the transfer speed of the ink module transfer part 23 increases, the shorter the width of the pulse waves 2a output from the encoder 24 may become.

The ink ejection controller 25 may be composed of a plurality of ink ejection controllers 25 to be connected with the ink jet bodies 21, respectively. The plurality of ink ejection controllers 25 may respectively interwork with the ink jet bodies 21 to adjust a jetting timing of the ink ejected from the ink jet bodies 21. In this case, the ink ejection controller 25 may receive an alternative pulse wave 3b from the signal splitter 26 to adjust the jetting timing of the ink, may obtain a location of the ink jet body 21 by means of the received alternative pulse wave 3b, and may transmit an ink ejection command to the ink jet body 21 such that the ink is jetted from a location at which the ink will be jetted.

The signal splitter 26 may be connected between the encoder 24 and the plurality of ink ejection controllers 25 and may transmit the movement signal for each movement distance, which is output from the encoder 24, to the plurality of ink ejection controllers 25. In this case, the signal splitter 26 may count the number of pulse waves 2a, which are a signal for each movement distance, which is input from the encoder 24, in a defined unit to generate the alternative pulse wave 3b in which a width as much as the signal width of the pulse waves 2a is reset and may transmit the generated alternative pulse wave 3b to the ink ejection controller 25. For example, when the encoder 24 outputs one pulse wave 2a when the ink module transfer part 23 moves at intervals of 100 nm and when the encoder 24 outputs 10 pulse waves 2a as the ink module transfer part 23 moves 1000 nm, the signal splitter 26 may count the 10 pulse waves 2a output from the encoder 24 in a defined unit and may reset a width the 10 pulse waves 2a to generate one alternative pulse wave 3b. At this time, when the width of the one pulse wave 2a output from the encoder 24 is 10 ns, the signal splitter 26 may generate the alternative pulse wave 3b with the width of 100 ns when the width of the 10 pulse waves 2a is reset. At this time, the time point when the alternative pulse wave 3b is generated may be a time point 90 ns when the 10th pulse wave 2a output from the encoder 24 is received. In this case, as show in FIG. 3, as the duty ratio of the width of the alternative pulse wave 3b may be adjusted, the alternative pulse wave 3b may be output with a width different from the width of the alternative pulse wave 3b shown in FIG. 2. As such, it may be seen that the ink ejection location moves 1000 nm whenever the ink ejection controller 25 receives the alternative pulse wave 3b with the width of 100 ns. Herein, when counting the pulse waves 2a output from the encoder 24 for each defined unit to generate the alternative pulse waves 3b, the signal splitter 26 may more effectively convert the pulse waves 2a of the encoder 24 into the alternative pulse waves 3b by using a multiplier.

As such, because of forming the pulse waves 2a, each of which has a short width, which are output from the encoder 24, into one alternative pulse wave 3b to transmit the alternative pulse wave 3b to the ink ejection controller 25, the signal splitter 26 may distribute the signal of the encoder 24 to the plurality of ink ejection controllers 25. Furthermore, because the ink ejection controllers 25 are not selected as an expensive product group robust to noise, production costs may be reduced.

Meanwhile, as described above, when counting pulse waves 2a output from the encoder 24 in units, resetting a width of the pulse waves 2a, and outputting the pulse waves, the width of which is reset, for example, when generating 10 pulse waves 2a as one alternative pulse wave 3b, the signal splitter 26 may fail to detect a minute movement distance corresponding to one pulse wave 2a. To this end, as described above, while counting the pulse waves 2a in units of a number where the pulse waves 2a are added, that is, in the same defined unit, for example, in units of 10 to generate the alternative pulse wave 3b, the signal splitter 26 may adjust a number where the pulse waves 2a are added to be different from an existing number where the pulse waves 2a are added at a certain period or a timing of a predetermined program command to output an alternative pulse wave 4b for precision movement. For example, the signal splitter 26 may count the pulse waves 2a output from the encoder 24 in units of 10 to periodically output one alternative pulse wave 3b in the state where it sets the defined unit to 10. At this time, the signal splitter 26 may correct a program to count 9 pulse waves 2a or 11 pulse waves 2a in one non-defined unit to generate the alternative pulse wave 4b for precise movement in the process of periodically counting 10 pulse waves 2a in one defined unit. Then, receiving the alternative pulse wave 4b for precision movement, which is obtained by counting the 9 pulse waves 2a in the one non-defined unit, the ink ejection controller 25 knows that the movement distance of the ink jet body 21 is a distance corresponding to 9 rather than a distance corresponding to 10. Likewise, receiving the alternative pulse wave 4b for precision movement, which is obtained by counting the 11 pulse waves 2a in the one non-defined unit, the ink ejection controller 25 knows that the movement distance of the ink jet body 21 is a distance corresponding to 11 rather than a distance corresponding to 10.

As such, the signal splitter 26 may count the pulse waves 2a output from the encoder 24 to output the one alternative pulse wave 3b per defined unit and may output the alternative pulse wave 4b for precision movement to vary in a number where the pulse waves 2a are added at a certain period or a predetermined specific timing to know the movement distance of the ink jet body 21 in units of resolution of the encoder 24, thus ejecting the ink even without adopting an ink ejection controller in a high-performance product group.

Hereinafter, a description will be given of a control method for a substrate processing device described above.

Figure 4:
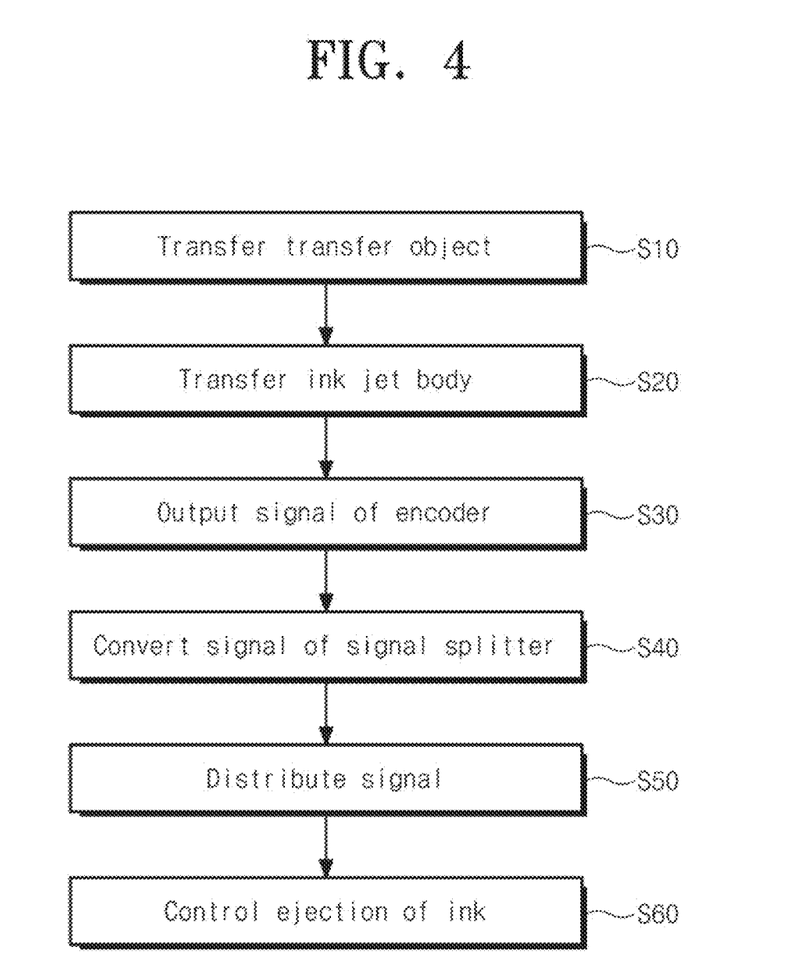
FIG. 4 is a flowchart of a control method for a substrate processing device according to an embodiment of the inventive concept.

FIG. 4 is a flowchart of a control method for a substrate processing device according to an embodiment of the inventive concept.

Referring to FIG. 4, the control method for the substrate processing device according to an embodiment of the inventive concept may include transferring (S10) a transfer object, transferring (S20) an ink jet body, outputting (S30) a signal of an encoder, converting (S40) a signal of a signal splitter, distributing (S50) a signal, and controlling (S60) ejection of ink.

First of all, in operation S10, a substrate transfer part 10 of FIG. 1 may transfer a display substrate, which is a transfer object 1*a* received on a substrate transfer part 10 of FIG. 1, under a predetermined command of a base controller 13 of FIG. 1 to arrange the display substrate, which is the transfer object 1*a*, at a specific location under an ink jet body 21 of FIG. 1.

In operation S20, an ink module transfer part 23 of FIG. 1 may transfer the ink jet body 21 disposed over the display substrate.

In operation S30, an encoder 24 of FIG. 1 may output pulse waves 2*a*, which are a movement signal, per movement distance when the ink jet body 21 moves. For example, as described above, the encoder 24 may output one pulse wave 2*a* when the ink jet body 21 moves per 100 nm as the ink module transfer part 23 is driven.

In operation S40, a signal splitter 26 of FIG. 1 may receive pulse waves 2*a* from the encoder 24, may count a number where the pulse waves 2*a* are received, and may output an alternative pulse wave 3*b* when the pulse waves 2*a* are received by a defined unit. For example, as described above, the signal splitter 26 may count the signal of the pulse waves 2*a* output from the encoder 24 and may output one alternative pulse wave 3*b* when the counted number is 10. At this time, the width of the alternative pulse wave 3*b* output from the encoder 24 may be output to be the same as a value obtained by adding widths of all pulse waves 2*a* before being reset or may be set to be greater than or equal to the widths of the pulse waves 2*a* of the encoder 24.

Furthermore, as described above, in operation S40, the signal splitter 26 may generate the alternative pulse wave 3*b* for each defined unit of the pulse waves 2*a* and may output an alternative pulse wave 4*b* for precision movement in a non-defined unit deviating from the defined unit, such that the movement distance of the ink jet body 21 is detected in in units of resolution of the encoder 24.

In operation S50, the signal splitter 26 may output and distribute the alternative pulse wave 3*b* to each ink ejection controller 25. Receiving the alternative pulse wave 3*b*, the ink ejection controller 25 may identify the location of the ink jet body 21 based on the width of the alternative pulse wave 3*b*.

In operation S60, the ink ejection controller 25 may adjust and set location information of the ink jet body 21 by the width of the received alternative pulse wave 3*b* and the counted number. When the corresponding location corresponds to a location to which ink will be jetted, the ink ejection controller 25 may transmit a jetting command such that the ink jet body 21 jets the ink. When the corresponding location corresponds to a location to which the ink will not be jetted, the ink ejection controller 25 may fail to transmit the jetting command.

As such, in the substrate processing device and the control method for the substrate processing device according to an embodiment of the inventive concept, the signal splitter 26 may count the signal of the encoder 24 and may output the alternative pulse wave 3*b*, the width of which is reset, such that the pulse waves 2*a* of the encoder 24, which are input to the ink ejection controller 25, are distinguished from noise, such that an expensive ink ejection controller is not used not to increase production costs, and such that the ink module transfer part 23 moves at a higher speed than before to improve productivity.

In the inventive concept, a signal splitter outputs an alternative pulse wave in place of the signal of the encoder to distinguish pulse waves of the encoder, which are input to an ink ejection controller, from noise, such that an expensive ink ejection controller is not used not to increase production costs, and such that a movement speed of an ink jet body is more improved than before to improve productivity.

As described above, the inventive concept has been described by specific details such as specific components, limited embodiments, and drawings, but these are provided to help a more general understanding of the inventive concept, and the inventive concept is not limited to the above embodiments. Those skilled in the art in the field to which the inventive concept pertains may make various modifications and variations from these descriptions.

Thus, the spirit of the inventive concept should not be limited to the described embodiments, and the claims to be described later and all modifications equivalent to these claims belong to the scope of the inventive concept.

What is claimed is:

1. A substrate processing device, comprising:
   a substrate transfer part on which a transfer object is received; and
   a jetting system part including:
     an ink jet body configured to jet and print ink on the transfer object over an upper surface of the substrate transfer part;
     an ink module transfer part configured to transfer the ink jet body;
     an encoder disposed around the ink module transfer part and configured to output a movement signal per unit movement distance of the ink module transfer part;
     an ink ejection controller configured to interwork with the ink jet body to control an ink jetting timing of the ink jet body; and
     a signal splitter configured to interwork with the encoder to count the movement signal, reset a width of the counted movement signal, and transmit the movement signal, the width of which is reset, to the ink ejection controller,
   wherein the encoder outputs the movement signal as pulse waves,
   wherein the signal splitter counts the pulse waves output from the encoder for each defined unit and resets the widths of the counted pulse waves to output an alternative pulse wave, and
   wherein the alternative pulse wave is generated at a time point when the last pulse wave in the defined unit is received by the signal splitter.

2. The substrate processing device of claim 1, wherein the signal splitter outputs an alternative pulse wave for precision movement in a non-defined unit deviating from the defined unit together with the alternative pulse wave.

3. The substrate processing device of claim 2, wherein the signal splitter subtracts or adds a width corresponding to one or more pulse waves output from the encoder from or to the pulse waves output from the encoder when outputting the alternative pulse wave for precision movement.

4. The substrate processing device of claim 1, wherein a plurality of ink jet bodies and a plurality of ink ejection controllers interwork with each other to jet the ink, and
wherein the signal splitter outputs the alternative pulse wave to each of the plurality of ink ejection controllers.

5. The substrate processing device of claim 1, wherein the signal splitter generates the alternative pulse wave using a multiplier.

6. The substrate processing device of claim 1, wherein the ink module transfer part includes:
a module base on which the ink jet body is mounted;
an actuator driving part configured to transfer the module base in one direction; and
an ink module location controller configured to control the actuator driving part to transfer the module base and control a location where the ink is jetted.

7. The substrate processing device of claim 6, wherein the ink module location controller interworks with the encoder to obtain location information of the module base from the encoder.

8. The substrate processing device of claim 1, wherein the substrate transfer part includes a base controller configured to control a position of the transfer object depending on a predetermined work command.

9. A substrate processing device, comprising:
a substrate transfer part on which a transfer object is received; and
a jetting system part including:
an ink jet body configured to jet and print ink on the transfer object over an upper surface of the substrate transfer part;
an ink module transfer part configured to transfer the ink jet body;
an encoder disposed around the ink module transfer part and configured to output a movement signal per unit movement distance of the ink module transfer part;
an ink ejection controller configured to interwork with the ink jet body to control an ink jetting timing of the ink jet body; and
a signal splitter configured to interwork with the encoder to count the movement signal, reset a width of the counted movement signal, and transmit the movement signal, the width of which is reset, to the ink ejection controller,
wherein the encoder outputs the movement signal as pulse waves to the signal splitter,
wherein the signal splitter counts widths of the pulse waves and resets the counted widths to output an alternative pulse wave,
wherein the signal splitter counts the pulse waves output from the encoder for each defined unit and resets the widths of the counted pulse waves to output the alternative pulse wave,
wherein the alternative pulse wave is generated at a time point when the last pulse wave in the defined unit is received by the signal splitter,
wherein the signal splitter outputs an alternative pulse wave for precision movement in a non-defined unit deviating from the defined unit together with the alternative pulse wave,
wherein the signal splitter subtracts or adds a width corresponding to one or more pulse waves output from the encoder from or to the pulse waves output from the encoder when outputting the alternative pulse wave for precision movement,
wherein a plurality of ink jet bodies and a plurality of ink ejection controllers interwork with each other to jet the ink,
wherein the signal splitter outputs the alternative pulse wave to each of the plurality of ink ejection controllers,
wherein the signal splitter generates the alternative pulse wave using a multiplier,
wherein the ink module transfer part includes:
a module base on which the ink jet body is mounted;
an actuator driving part configured to transfer the module base in one direction; and
an ink module location controller configured to control the actuator driving part to transfer the module base and control a location where the ink is jetted, and
wherein the ink module location controller interworks with the encoder to obtain location information of the module base from the encoder.

\* \* \* \* \*